(12) United States Patent
Mickael

(10) Patent No.: US 10,473,814 B2
(45) Date of Patent: Nov. 12, 2019

(54) LOGGING-WHILE-DRILLING SPECTRAL AND AZIMUTHAL GAMMA RAY APPARATUS AND METHODS

(71) Applicant: Scientific Drilling International, Inc., Houston, TX (US)

(72) Inventor: Medhat Mickael, Sugar Land, TX (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 15/855,593

(22) Filed: Dec. 27, 2017

(65) Prior Publication Data

US 2018/0188408 A1  Jul. 5, 2018

Related U.S. Application Data

(60) Provisional application No. 62/439,919, filed on Dec. 29, 2016.

(51) Int. Cl.
*G01V 5/06* (2006.01)
*G01T 1/208* (2006.01)
*G01T 1/202* (2006.01)

(52) U.S. Cl.
CPC ............... *G01V 5/06* (2013.01); *G01T 1/202* (2013.01); *G01T 1/208* (2013.01)

(58) Field of Classification Search
CPC ............ G01V 5/06; G01T 1/202; G01T 1/208
See application file for complete search history.

(56) References Cited

U.S. PATENT DOCUMENTS

| | | | |
|---|---|---|---|
| 4,316,053 A | 2/1982 | Rieffle | |
| 5,397,893 A * | 3/1995 | Minette | E21B 47/00 250/254 |
| 7,253,401 B2 * | 8/2007 | Mickael | G01V 5/06 250/261 |
| 2004/0128073 A1 * | 7/2004 | Radtke | E21B 47/026 702/8 |
| 2013/0277114 A1 * | 10/2013 | Hook | E21B 47/011 175/50 |
| 2016/0130932 A1 * | 5/2016 | Logan | E21B 17/003 166/66 |
| 2017/0089846 A1 * | 3/2017 | Guo | E21B 47/0005 |

FOREIGN PATENT DOCUMENTS

CA       2416729 C       4/2011

OTHER PUBLICATIONS

International Search Report and Written Opinion issued in international application No. PCT/US17/68536 dated Mar. 5, 2018 (7 pages).

* cited by examiner

*Primary Examiner* — Michael C Bryant
(74) *Attorney, Agent, or Firm* — Adolph Locklar (57) ABSTRACT

A downhole assembly includes a drill collar, the drill collar having an outer wall and an insert, the insert positioned within drill collar. The insert has a bore therethrough. The downhole assembly further includes at least one sensor within the insert, wherein the sensor is a gamma ray detector.

16 Claims, 7 Drawing Sheets

LOGGING-WHILE-DRILLING SPECTRAL AND AZIMUTHAL GAMMA RAY APPARATUS AND METHODS

CROSS-REFERENCE TO RELATED APPLICATIONS

This application is a non-provisional application which claims priority from U.S. provisional application No. 62/439,919, filed Dec. 29, 2016.

FIELD

The present disclosure is directed to an apparatus and method to measure gamma rays from within a formation.

BACKGROUND

Spectral gamma detectors may be used in logging while drilling (LWD) activities to measure gamma rays in a formation. Mickael et. al. (U.S. Pat. No. 7,253,401, B2) placed a gamma ray detector in the outer wall of a drill collar to minimize the collar attenuation effects. However, placing the gamma ray detector in the outer wall of the drill collar complicates tool design and makes the tool more expensive. In addition, the gamma ray detector may be more susceptible to wear and less accessible for maintenance.

The gamma ray detector has been placed in a sonde in the bore of the collar. Attempts have been made to use a sonde for spectral gamma ray measurements but these attempts have failed because of collar attenuation effects. Moreover, a gamma ray detector placed in a sonde cannot provide azimuthal measurements without the use of a shield, which reduces gamma ray detector counts.

SUMMARY

The present disclosure provides for a downhole assembly. The downhole assembly includes a drill collar, the drill collar having an outer wall and an insert, the insert positioned within a drill collar. The insert has a bore therethrough. The downhole assembly further includes at least one sensor within the insert, wherein the sensor is a gamma ray detector.

The present disclosure further provides for a method. The method includes positioning a gamma ray detector within a borehole, the borehole within a formation. The gamma ray detector is positioned within a drill collar of a downhole assembly. The method also includes receiving gamma rays with the gamma ray detector and tallying detector counts from the gamma ray detector. The method further includes forming a gamma ray spectrum.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure are directed towards a logging tool for measuring formation parameters. In certain embodiments, measurements may include spectral gamma, such as for determining TOC and for geosteering.

Figure 1:
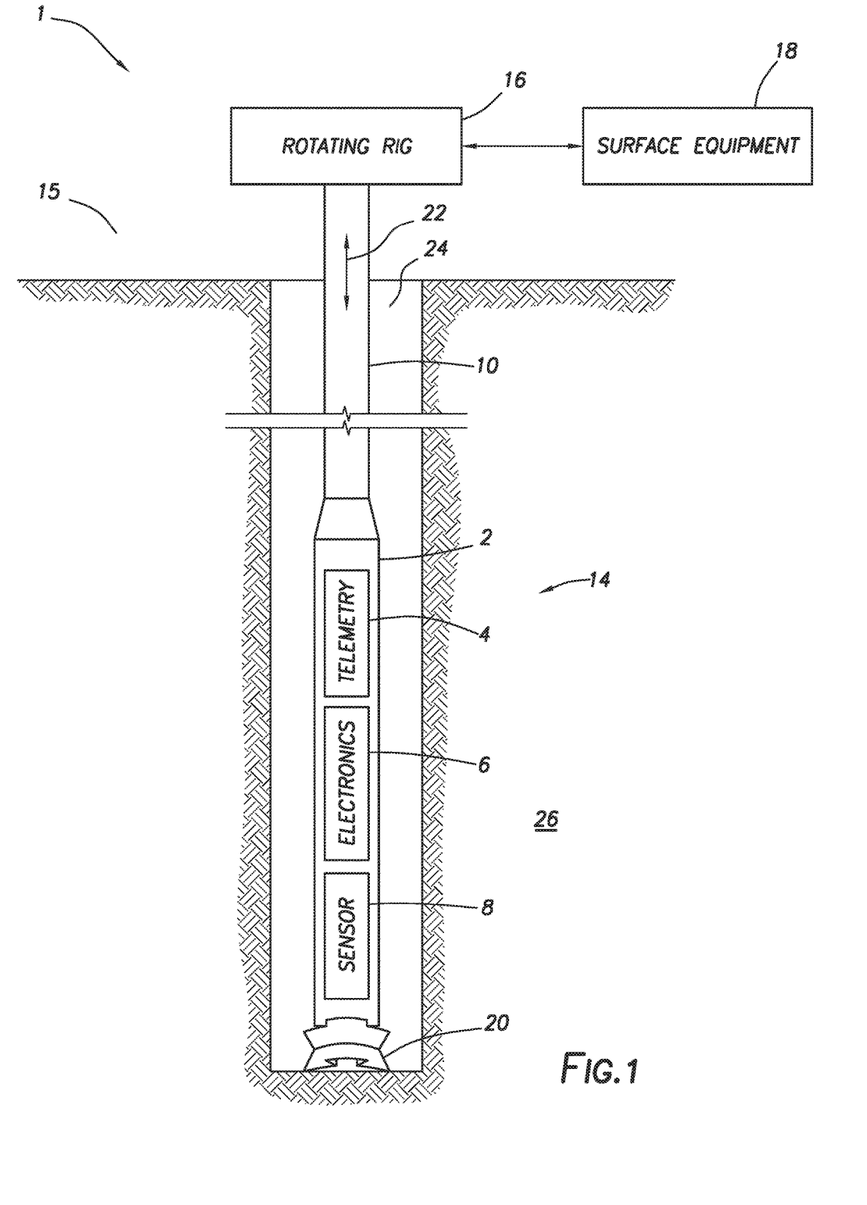
FIG. 1 is a block diagram of a drilling a downhole assembly consistent with at least one embodiment of the present disclosure.

FIG. 1 is block a diagram of logging while drilling system 1 including downhole assembly 14 consistent with at least one embodiment of the present disclosure. Downhole assembly 14 includes drill collar 2. Downhole assembly 14 may include sensors 8 and associated electronics 6 (including, for example, one or more microprocessors) and telemetry section 4. Telemetry section 4 may include a transmitter or transceiver, such as a mud pulse generator, or an acoustic or electromagnetic transmitter to transmit measurement data from sensors 8 and associated electronics 6 to surface 15 as illustrated by telemetry arrow 22. When telemetry section 4 includes a transceiver, data and instructions may be communicated to downhole assembly 14 from surface equipment 18. Surface equipment 18 may include a receiver, a transceiver, and equipment for storage of measurement data and providing instructions to downhole assembly 14, much as a micro-processor and computer-readable, non-transitory media. Wired pipe may also be used to communicate from downhole assembly 14 to surface equipment 18 and vice versa. Drill string 10 terminates in bit 20. Downhole assembly 14 may be conveyed in borehole 24 that penetrates formation 26 by rotating drill string 10 from surface rig 16 (indicated by rotating rig 16 in FIG. 1).

Figure 2:
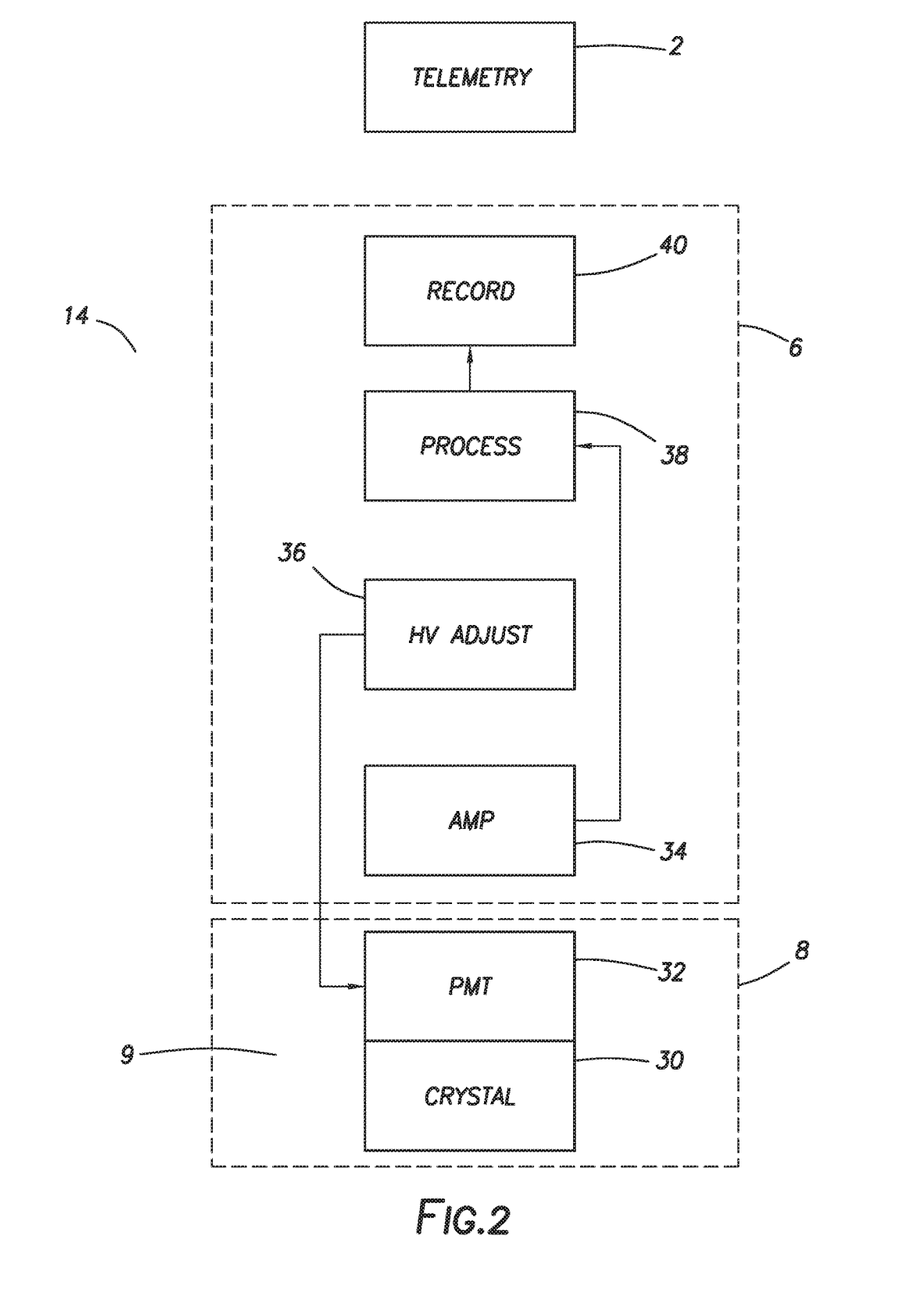
FIG. 2 is block diagram of a portion of a downhole assembly consistent with at least one embodiment of the present disclosure.

FIG. 2 is a block diagram of a portion of downhole assembly 14 consistent with certain embodiments of the present disclosure. Gamma ray detector 9 includes at least one scintillation crystal 30 and photomultiplier tube (PMT) 32. Sensors 8 may include one or more gamma ray detectors 9. Signals from photomultiplier tube 32 may be gain adjusted. In certain embodiments, the gain of the signal from photomultiplier tube 32 is a function of downhole temperature and may be adjusted using high voltage adjustment circuit (HVC) 36 to form a gain-adjusted signal. The gain-adjusted signal is amplified using amplifier 34. The amplified signals are processed using processing circuit 38, and recorded using a recording circuit 40. In certain embodiments, the amplified signals are fast rise, slow decay pulses with a width of a few microseconds. The pulses are fed to processor circuit 38 where the peak of the pulse is determined. The height of the pulse (at the peak) is proportional to the energy of the gamma ray. Processing circuit 38 may tally the number of gamma rays with different heights (energies) to construct a spectrum of counts versus energy. Data from processor circuit 38 may be transmitted to the surface using telemetry section 4. Telemetry section 4 may be located anywhere within downhole assembly 14.

Figure 3:
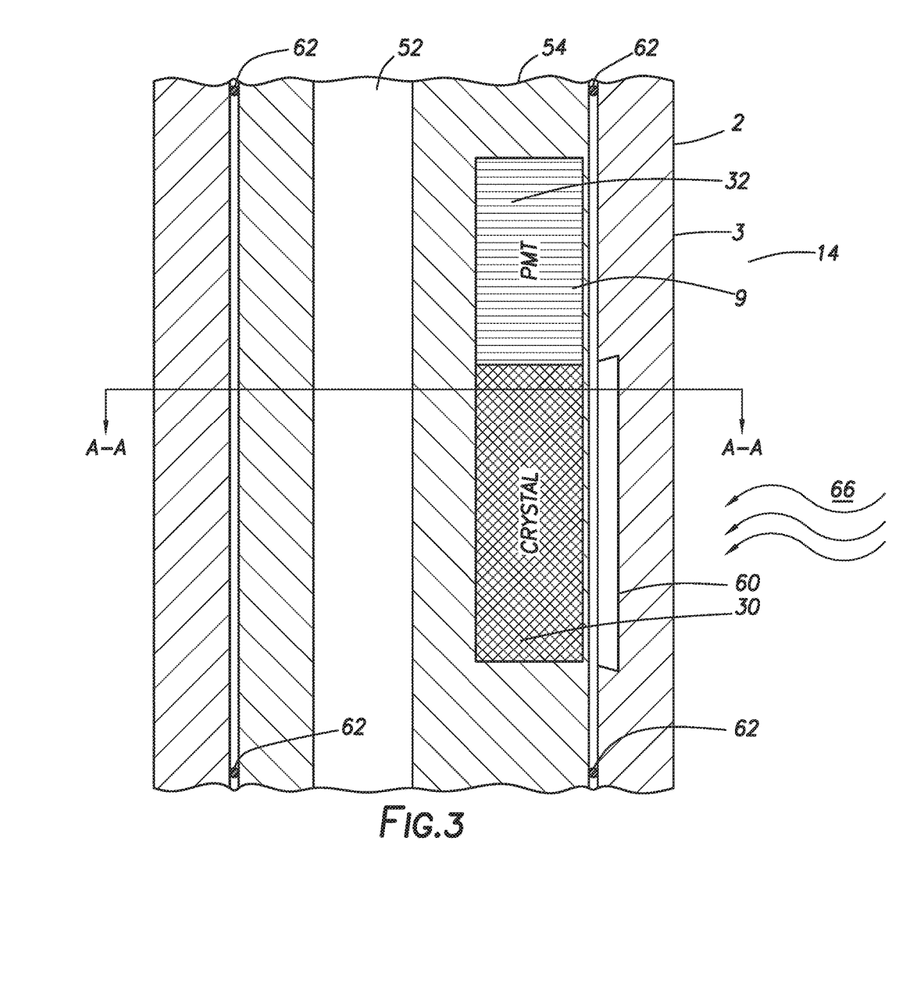
FIG. 3 is a longitudinal cross-sectional view of the downhole assembly consistent with certain embodiments of the present disclosure.

FIG. 3 is a longitudinal cross-sectional view of downhole assembly 14. Insert 54 is positioned within collar 2. In certain embodiments, gasket 62, such as an O-ring, may be positioned between insert 54 and outer wall 3 of drill collar 2. Insert 54 includes bore 52 to allow mud flow from surface 15 to pass through downhole assembly 14. Bore 52 may be centered within collar 2 or may be off-center within collar 2, as shown in FIG. 3. Positioning bore 52 in an off-centered positioned may allow a larger gamma ray detector 9 than a centered bore 52. Scintillation crystal 30 and photomultiplier tube 32 are positioned within insert 54. While FIG. 3 depicts a single gamma ray detector 9, multiple gamma ray detectors 9 may be positioned within insert 54, such as, for example, circumferentially around bore 52. As shown in FIG. 3, window 60 may be formed in outer wall 3 of drill collar 2. Window 60 may be used to reduce gamma ray attenuation through outer wall 3 of drill collar 2. In certain embodiments of the present disclosure, outer wall 3 may be between 0.25" to 1" or between 0.25" and 0.75" or about 0.5." In some embodiments of the present disclosure, window 60 may be between 0" and 0.75", or between 0.25" and 0.75" or about 0.5".

Figure 4:
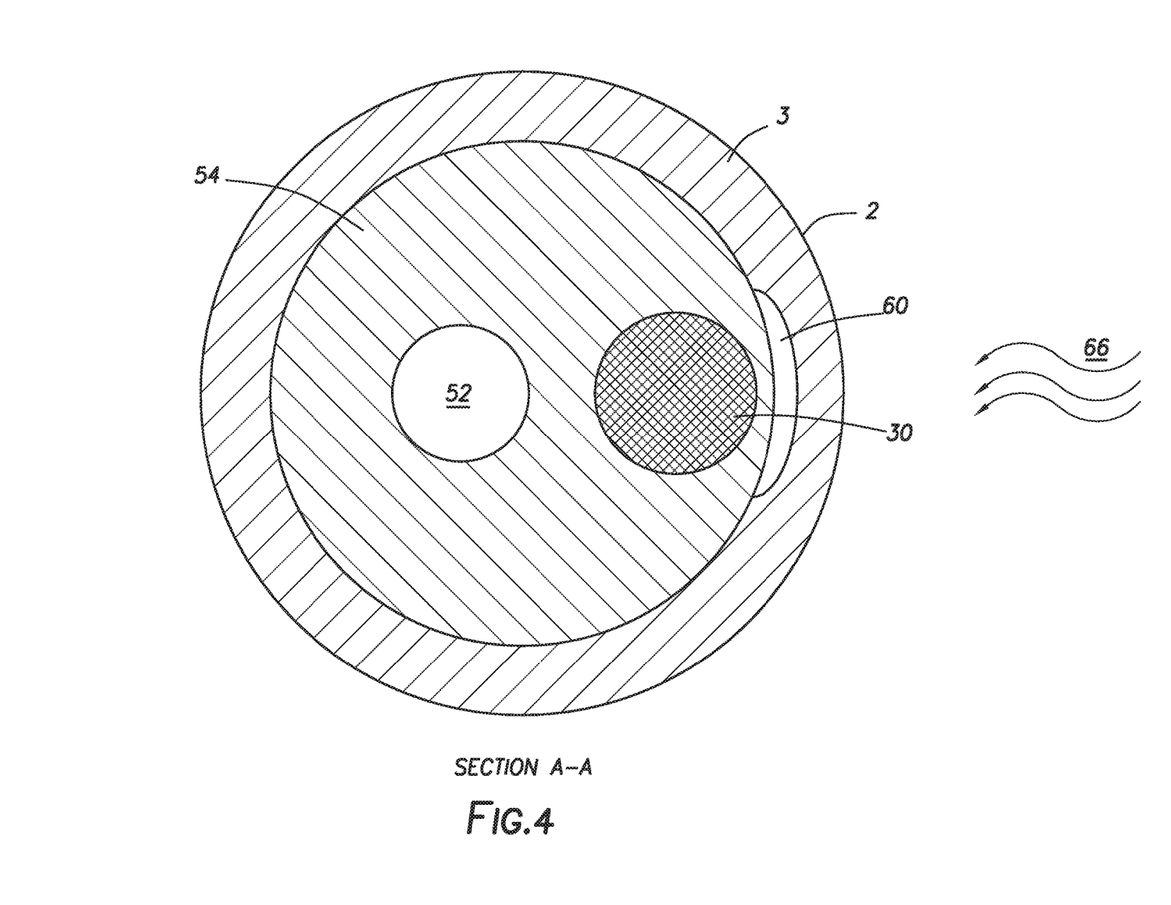
FIG. 4 is a lateral cross-sectional view of the downhole assembly consistent with certain embodiments of the present disclosure.

FIG. 4 is a lateral cross-sectional view of downhole assembly 14 taken along cutline A-A of FIG. 3. FIG. 4 depicts an embodiment where bore 52 is positioned off-center within insert 54.

Gamma ray 66 present in formation 26 may be detected by scintillation crystal 30 after penetrating outer wall 3 of drill collar 2. Factors that affect the ability of the scintillation crystal to detect the incident gamma ray at its characteristic energy include (1) the degree of attenuation of the gamma rays prior to reaching gamma ray detectors 9, which is mainly a function of the thickness of outer wall 3; (2) the density of the crystal material—the higher the density the higher the detection efficiency; and (3) the size of the crystal—the larger the crystal the higher the detection efficiency. The embodiments of the present disclosure increase the ability of gamma ray detector 9 to capture natural gamma rays at its characteristic energies over traditional gamma ray detectors. In certain embodiments, increasing the ability of the detector to capture natural gamma rays may include using a large and high-density scintillation crystal in offset bore 52 within insert 54 and/or minimizing outer wall 3 thickness in front of gamma ray detector 9 using window 60. The count rates are proportional to the square of the radius and linear with length of the crystal. A small increase in radius of the crystal can significantly increase the count rate—hence the offset bore to allow a larger-diameter detector. Examples of high-density crystals are lanthanum Bromide, BGO, and GSO. Without being bound by theory, count rate decreases exponentially with thickness of the collar. In certain embodiments, a wall thickness of 0.5" results in approximately a 15-20% reduction in count rate and a thickness of 1" results in approximately a 35-45% reduction in count rate depending on the energy of the incident gamma ray. The lower the energy of the gamma ray, the higher the attenuation and the lower the count rates.

Figure 5:
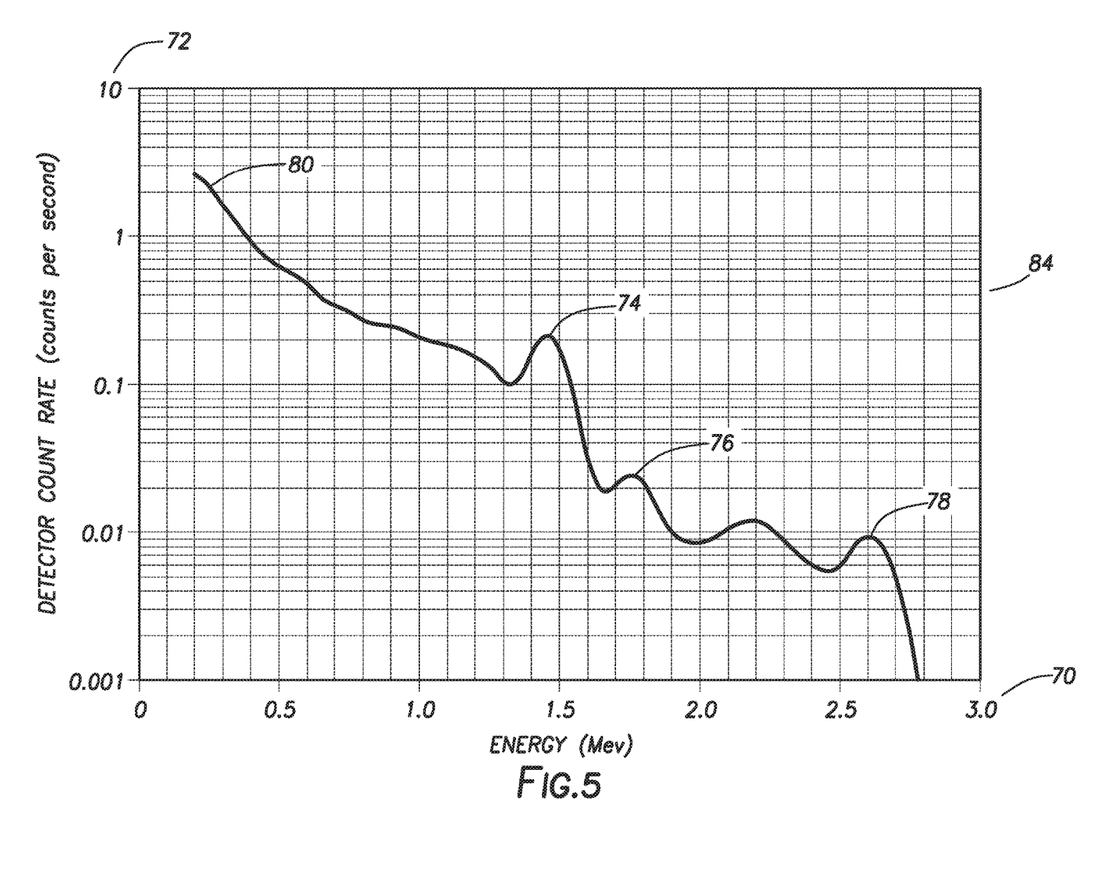
FIG. 5 is a graphical depiction of an example of a gamma ray spectrum recorded by a gamma ray detector consistent with certain embodiments of the present disclosure.

Gamma ray detector 9 may be a spectral gamma ray detector, which may provide potassium, uranium and thorium concentrations for total organic carbon (TOC) determination in addition to total gamma ray and azimuthal gamma ray measurements. FIG. 5 graphically depicts an example of gamma ray spectrum 84 recorded by gamma ray detector 9. X axis 70 is the energy of the incident gamma ray and Y axis 72 is the number of counts per second (count rate) received by gamma ray detector 9 at each energy level. Without being bound by theory, natural gamma rays of formation 26 is produced by one of three elements: potassium (K), uranium (U), and thorium (Th). Each element has one or more characteristic gamma rays. Potassium has a single characteristic gamma ray at 1.46 million electron volt (MeV). Uranium has several characteristic gamma rays but the predominant ray is at 1.76 MeV. Thorium also has several characteristic gamma rays but the predominant ray is at 2.64 MeV. In addition to the characteristic gamma rays, gamma ray detector 9 also receives gamma rays after the gamma rays have been scattered through a medium inside or inside gamma ray detector 9. If gamma ray detector 9 receives a gamma ray at the gamma ray characteristic energy, a peak at that energy will be visible in the spectrum. For example, peak 74 in FIG. 5 represents the characteristic gamma ray of potassium, peak 76 represents the 1.76 MeV characteristic gamma ray of uranium, and peak 78 represents the 2.64 MeV characteristic gamma ray of thorium. The portion of the spectrum marked as 84 in FIG. 5 represents gamma rays received after the gamma rays have been scattered inside or outside gamma ray detector 9. This portion of the spectrum does not have strong character and may be a sum of scattered gamma rays from all three elements. In spectral gamma ray measurements, gamma rays may be captured at the characteristic energies of the gamma rays to easily and accurately obtain the concentration of K, U, and Th from a mathematical solution. An example of such a mathematical solution is found in U.S. Pat. No. 7,253,401, which is incorporated herein by reference.

Figure 6:
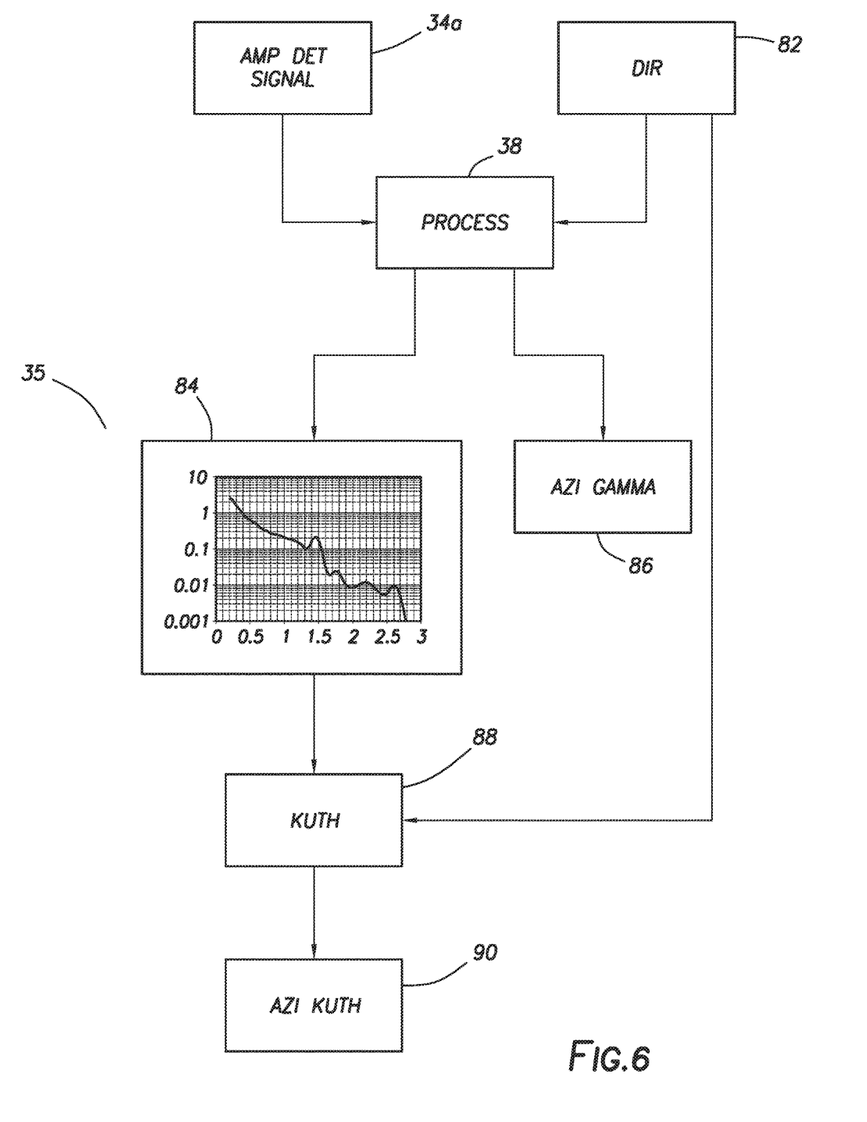
FIG. 6 is a flowchart depicting a gamma ray processing method consistent with certain embodiments of the present disclosure.

FIG. 6 is a flowchart depicting gamma ray processing method 35. Amplified detector signals 34a from are sent to processor circuit 38. Processor circuit 38 tallies the detector counts as a function of incident gamma ray energy to form gamma ray spectrum 84. Processor circuit 38 determines the height of the pulse, which is proportional to the gamma ray energy. The relationship between pulse height and gamma ray energy may be determined from calibration. Signals from directional sensor 82 are also fed to the processing unit 38 to correlate measurements with azimuthal angle. Directional sensors 82 may be, for example, magnetometers. In certain embodiments, directional sensors 82 may be a portion of sensors 8, as described above. When total gamma ray (sum of all counts received by the detector) are correlated to azimuthal angle, a total azimuthal gamma ray measurement 86 is produced.

Gamma ray spectrum 84 may be used to determine the concentrations of K, U, and Th. This determination may be made, for example, by fitting the measured spectrum to base or standard spectra of K, U, and Th or by least-squares solutions correlating the counts received in windows around the main K, U, and Th peaks to those of standard models.

Gamma ray spectrum 84 is used to generate K, U, and Th concentrations in KUTH 88. In addition, combining the KUTH measurements with the signals from directional sensor 82 results in measurement of K, U, and Th concentrations as a function of azimuth in AZI KUTH 90.

Figure 7:
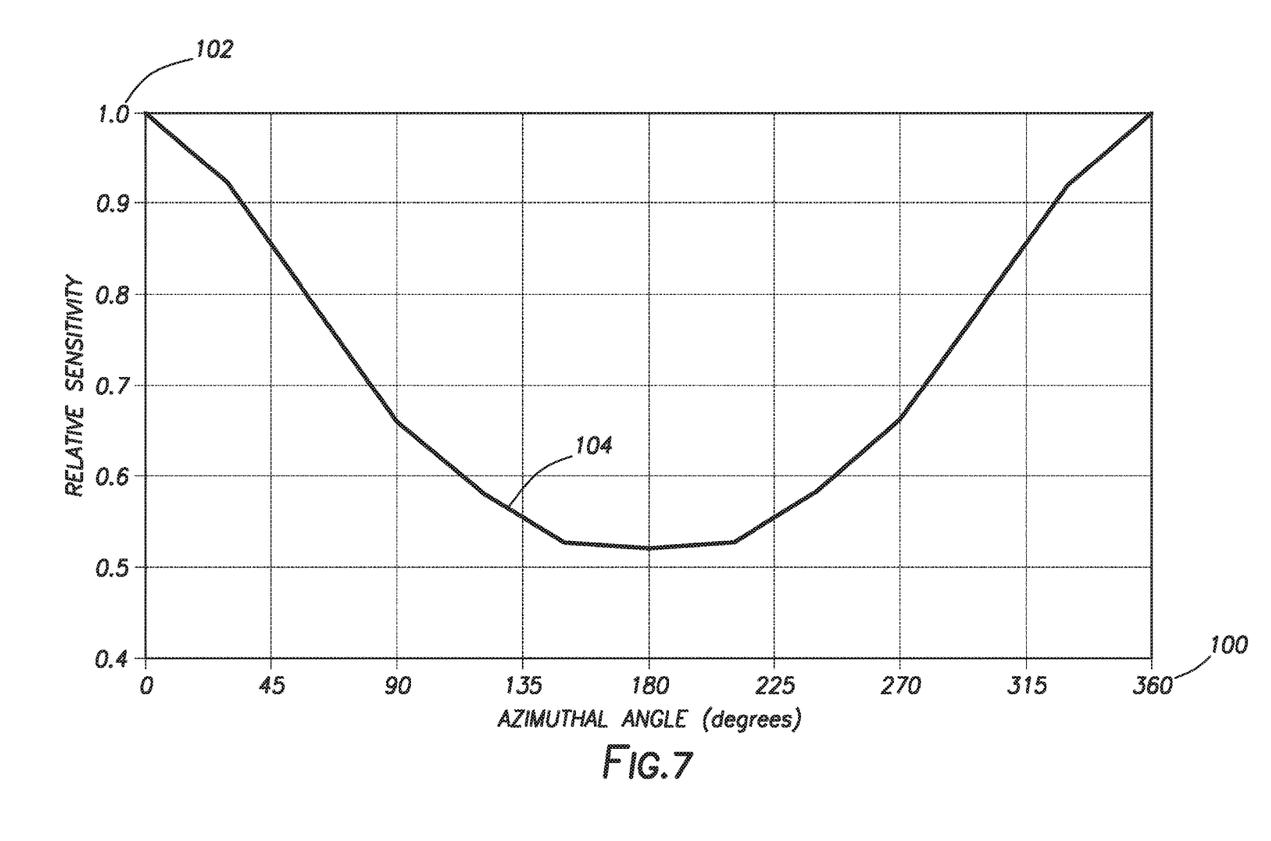
FIG. 7 is a graphical depiction of azimuthal angle in relation to relative sensitivity consistent with certain embodiments of the present disclosure.

FIG. 7 is a graphical depiction of azimuthal angle in relation to relative sensitivity. Such information may be calculated, for example by causing processor circuit 38 to set a timer to trigger every several milliseconds, typically between 5 and 25 ms. When the timer triggers, processor circuit 38 accumulates the gamma count since last trigger and determines toolface. Given a number of azimuthal bins or sectors defined in the firmware of process circuit 38, processor circuit 38 places the gamma counts in the appropriate bin for the measured toolface. For example, if 16 bins are defined between 0 and 360 degrees, each bin is 22.5 degrees wide. If the processor measures a toolface of 30 degrees, the associated gamma count rate is saved in the second bin, and so on. The reference of toolface is either magnetic north in a vertical well or gravity in deviated or horizontal well. X axis 100 is the azimuthal angle around borehole 24 extending from 0 to 360 degrees. Y axis 102 represents the relative azimuthal sensitivity of the measurement. Curve 104 represents the azimuthal measurement as downhole assembly 14 crosses an interface. For example, if the total gamma ray is measured as a function of azimuth and downhole assembly 14 is crossing an interface between a clean sandstone and a shale zone, total gamma ray may measure, for example, 100 units in the shale and 50 units in the sand. Therefore, the relative sensitivity would be 1 in the shale and 0.5 in the sand. Similarly, if K, U, and Th are measured as a function of azimuth, the K, U, and Th relative sensitivities will be presented similarly. The azimuthal sensitivity is used to inform the driller that the tool is passing through an interface between two formations of different properties (gamma ray activity in this case) so the driller may steer the well to avoid or penetrate one of the formations based on the value measured.

Certain embodiments of the present disclosure provide more accurate spectral gamma ray measurements while drilling in a robust, less expensive, and more accessible design than traditional gamma ray measurements. By placing gamma ray detector 9 within insert 54, maintenance and accessibility may be improved over traditional designs.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A downhole assembly comprising:
   a drill collar, the drill collar having an outer wall;
   an insert, the insert positioned within drill collar, the insert having a cylindrical outer wall, the insert having a bore therethrough; and
   at least one sensor within the insert, wherein the sensor is a gamma ray detector.

2. The downhole assembly of claim 1, wherein drill collar comprises a window within the outer wall.

3. The downhole assembly of claim 2, wherein the outer wall thickness is between 0.25 and 1.0 inch and the window thickness is between 0.0 and 0.75 inch.

4. The downhole assembly of claim 2, wherein the bore is off-center.

5. The downhole assembly of claim 2, wherein the bore is centered and two or more gamma ray detectors are positioned about the bore.

6. The downhole assembly of claim 2, wherein a gasket is positioned between the insert and the outer wall.

7. The downhole assembly of claim 1, wherein the gamma ray detector is a spectral gamma ray detector.

8. The downhole assembly of claim 1, where the gamma ray detector comprises a scintillation crystal and a photomultiplier tube.

9. The downhole assembly of claim 1 further comprising an electronics section and a telemetry section.

10. A method comprising:
    positioning a gamma ray detector within a borehole, the borehole within a formation, the gamma ray detector positioned within an insert, the insert having a cylindrical outer wall, the insert having a bore therethrough, the insert positioned within a drill collar of a downhole assembly;
    receiving gamma rays with the gamma ray detector;
    tallying detector counts from the gamma ray detector; and
    forming a gamma ray spectrum.

11. The method of claim 10 further comprising determining the formation concentrations of K, U, Th, or a combination thereof based on the gamma ray spectrum.

12. The method of claim 11, wherein the step of determining the formation concentration is performed by a least squares solution correlating the counts received by the gamma ray detector with those of a standard model.

13. The method of claim 10 further comprising determining the pulse heights of the gamma rays.

14. The method of claim 10 further comprising:
    providing a directional sensor, the direction sensor positioned within the downhole assembly;
    measuring azimuthal angle;
    calculating a sum of all counts received by the gamma ray detector, defining total gamma ray; and
    correlating total gamma ray to azimuthal angle to form a total azimuthal gamma ray measurement.

15. The method of claim 10 further comprising determining K, U, Th, or a combination thereof as a function of azimuth.

16. The method of claim 14 further comprising determining the presence of an interface from total gamma ray.

* * * * *